(12) United States Patent
Fujimura et al.

(10) Patent No.: US 6,190,429 B1
(45) Date of Patent: *Feb. 20, 2001

(54) METHOD AND APPARATUS FOR TREATING WASTES BY GASIFICATION

(75) Inventors: Hiroyuki Fujimura; Shosaku Fujinami; Tetsuhisa Hirose, all of Tokyo; Takahiro Oshita, Yokohama; Masaaki Irie; Kazuo Takano, both of Tokyo, all of (JP)

(73) Assignee: Ebara Corporation, Tokyo (JP)

( * ) Notice: Under 35 U.S.C. 154(b), the term of this patent shall be extended for 0 days.

This patent is subject to a terminal disclaimer.

(21) Appl. No.: 09/255,792

(22) Filed: Feb. 23, 1999

Related U.S. Application Data

(63) Continuation of application No. 08/877,810, filed on Jun. 18, 1997, now Pat. No. 5,922,090, which is a continuation-in-part of application No. 08/753,607, filed on Nov. 25, 1996, now abandoned, and a continuation of application No. 08/547,126, filed on Oct. 24, 1995, now Pat. No. 5,725,614, and a division of application No. 08/401,370, filed on Mar. 9, 1995, now Pat. No. 5,620,488.

(30) Foreign Application Priority Data

| Mar. 10, 1994 | (JP) | ................................................ 6-35439 |
| Apr. 14, 1994 | (JP) | ................................................ 6-101541 |
| Feb. 9, 1995 | (JP) | ................................................ 7-22000 |
| Nov. 28, 1995 | (JP) | ................................................ 7-331185 |
| Sep. 4, 1996 | (JP) | ................................................ 8-252234 |

(51) Int. Cl.⁷ .............................. C10J 3/54; B09B 3/00; F27B 15/08
(52) U.S. Cl. ....................... 48/197 R; 110/245; 110/346; 422/139
(58) Field of Search .............................. 48/197 R, 198.7, 48/127.7; 422/143, 144, 146, 139; 110/229, 235, 242, 245, 345, 346

(56) References Cited

U.S. PATENT DOCUMENTS

| 4,356,151 | 10/1982 | Woebcke et al. | .................... 422/145 |
| 4,419,330 | * 12/1983 | Ishihara et al. | .................... 422/143 |

(List continued on next page.)

FOREIGN PATENT DOCUMENTS

| 36 32 534 | 4/1987 | (DE) . |
| 44 35 349 | 5/1996 | (DE) . |

(List continued on next page.)

OTHER PUBLICATIONS

Akira Mano et al., "The Pyrolysis of Municipal Refuse by Two Bed System", Ebara Engineering Review No. 93, Ebara Corporation, Japan, 1975, pp. 1–6.

(List continued on next page.)

*Primary Examiner*—Shrive Beck
*Assistant Examiner*—Frederick Varcoe
(74) *Attorney, Agent, or Firm*—Wenderoth, Lind & Ponack, L.L.P.

(57) ABSTRACT

A method and apparatus for treating wastes by gasification recovers useful resources including energy, valuables such as metals, and gases for use as synthesis gas for chemical industries or fuel. The wastes are gasified in a fluidized-bed reactor at a relatively low temperature. Gaseous material and char produced in the fluidized-bed reactor are introduced into a high-temperature combustor, and low calorific gas or medium calorific gas is produced in the high-temperature combustor at a relatively high temperature. The fluidized-bed reactor preferably is a revolving flow-type fluidized-bed reactor. The high-temperature combustor preferably is a swirling-type high-temperature combustor.

39 Claims, 7 Drawing Sheets

U.S. PATENT DOCUMENTS

| | | | | |
|---|---|---|---|---|
| 4,452,155 | * | 6/1984 | Ishihara et al. | 110/346 |
| 4,541,345 | * | 9/1985 | Grumpelt et al. | 110/229 |
| 4,597,771 | | 7/1986 | Cheng | 48/77 |
| 4,602,573 | * | 7/1986 | Tanca | 110/342 |
| 4,676,177 | * | 6/1987 | Engstrom | 110/345 |
| 4,753,177 | | 6/1988 | Engström et al. | 110/299 |
| 4,823,740 | * | 4/1989 | Ohshita et al. | 122/4 D |
| 4,828,740 | * | 5/1989 | Farng et al. | 423/277 |
| 4,848,249 | * | 7/1989 | LePori et al. | 110/234 |
| 4,938,170 | * | 7/1990 | Ohshita et al. | 122/4 D |
| 4,971,599 | * | 11/1990 | Cordell et al. | 48/76 |
| 5,138,957 | * | 8/1992 | Morey et al. | 110/234 |
| 5,138,982 | | 8/1992 | Ohshita et al. | 122/4 D |
| 5,156,099 | * | 10/1992 | Ohshita et al. | 110/245 |
| 5,180,703 | * | 1/1993 | Ziebarth et al. | 502/243 |
| 5,313,913 | * | 5/1994 | Ohshita et al. | 122/4 D |
| 5,347,068 | | 9/1994 | Rabe et al. | 588/205 |
| 5,445,087 | * | 8/1995 | Kaneko | 110/235 |
| 5,505,907 | | 4/1996 | Hiltunen et al. | 422/146 |
| 5,550,312 | | 8/1996 | Schingnitz et al. | 588/205 |
| 5,922,090 | * | 7/1999 | Fujimura et al. | 48/197 R |

FOREIGN PATENT DOCUMENTS

| | | | |
|---|---|---|---|
| 0 072 102 | | 2/1983 | (EP). |
| 0 153 235 | | 8/1985 | (EP). |
| 0 436 056 | * | 7/1991 | (EP). |
| 0 648 829 | | 4/1995 | (EP). |
| 0 676 464 | | 10/1995 | (EP). |
| 0 676 465 | | 10/1995 | (EP). |
| 54-38661 | | 3/1979 | (JP). |
| 54-117170 | | 9/1979 | (JP). |
| 56-3810 | | 1/1981 | (JP). |
| 61-105018 | | 5/1986 | (JP). |
| 62-35004 | | 7/1987 | (JP). |
| 63-172808 | | 7/1988 | (JP). |
| 64-84014 | | 3/1989 | (JP). |
| 2-147692 | * | 6/1990 | (JP). |
| 2-157509 | | 6/1990 | (JP). |
| 6-9967 | | 1/1994 | (JP). |
| 6-307614 | | 11/1994 | (JP). |
| 7-332614 | | 12/1995 | (JP). |
| 8-261425 | | 10/1996 | (JP). |

OTHER PUBLICATIONS

"Testing and Evaluation of a Pressurized 10–T/H Fluid–Bed Wood Gasifier", Energy Biomass Wastes vol. 10th, Biosyn, Canada, 1987, pp. 713–721.

"Syngas Production Form Wood By Oxygen Gasification Under Pressure", Bioenergy 84, vol. 3, Creusot–Loire, France, 1985, pp. 73–78.

Patent Abstracts of Japan, vol. 12, No. 286 (M–727), & JP–A–63 061811 (Ebara Corp.) Mar. 18, 1988, *Abstract*.

VGB Kraftswerktechnik, vol. 73, No. 10, 1993, pp. 889–892, XP000398033, H.G. Kitzerow: "Stellenwert Der Wirbelschichtverbrennung Bei Der Thermischen Abfallverwetung",* p. 889—p. 892(with English Translation).

Shosaku Fujinami et al., "Fluidized–Bed Gasification of Cellulosic Wastes (1)", Ebara Engineering Review No. 151, Ebara Corporation, Japan, 1991, pp. 10–16.

Shosaku Fujinami et al., "Fluidized–Bed Gasification of Cellulosic Wastes (2)", Ebara Engineering Review No. 153, Ebara Corporation, Japan, 1991, pp. 18–24.

Patent Abstracts of Japan, vol. 12, No. 286 (M–727), & JP–A–63 061811 (Ebara Corp.) Mar. 18, 1988, *Abstract*.

* cited by examiner

F / G. 5

METHOD AND APPARATUS FOR TREATING WASTES BY GASIFICATION

This is a continuation of application Ser. No. 08/877,810, filed Jun. 18, 1997, now U.S. Pat. No. 5,922,090, which is a continuation-in-part of application Ser. No. 08/753,607, filed Nov. 27, 1996, now abandoned, and of application Ser. No. 08/547,126, filed Oct. 24, 1995, now U.S. Pat. No. 5,725,614, that is a division of application Ser. No. 08/401,370, filed Mar. 9, 1995, now U.S. Pat. No. 5,620,488.

BACKGROUND OF THE INVENTION

1. Field of the Invention

The present invention relates to a method and apparatus for treating wastes by gasification, and more particularly to a method and apparatus for treating wastes by gasification at a relatively low temperature and then at a relatively high temperature to recover useful resources including energy, valuables such as metals, and gases for use as materials for chemical industries or fuel.

2. Description of the Prior Art

It has heretofore been customary to treat a considerable amount of wastes such as municipal wastes, waste tires, sewage sludges, and industrial sludges with dedicated incinerators. Night soil and highly concentrated wastes have also been treated with dedicated wastewater treatment facilities. However, large quantities of industrial wastes are still being discarded, thus causing environmental pollution.

As waste treatment technology suitable for environmental conservation to replace conventional incineration systems, gasification and combustion systems which combine gasification and high-temperature combustion have been developed, and some of them are about to be put to practical use.

Among the developed gasification and combustion systems, there are a system having a vertical shaft furnace as a gasification furnace (hereinafter referred to as an "S system") and a system having a rotary kiln as a gasification furnace (hereinafter referred to as an "R system").

According to the S system, a drying/preheating zone at a temperature ranging from 200 to 300° C., a thermal decomposing zone at a temperature ranging from 300 to 1000° C., and a combusting/melting zone at a temperature of 1500° C. or higher are formed as accumulated layers in the gasification furnace. Wastes and coke charged into the furnace from an upper portion thereof descend in the furnace while exchanging heat with gases which have been generated in the lower zones. The generated gases that flow upward in the furnace are discharged from the furnace, and then combusted in a subsequent combustion furnace at a temperature of about 900° C. Carbonous materials generated in the thermal decomposing zone and the charged coke descend and enter the combusting/melting zone, and are combusted at a high temperature by oxygen-enriched air supplied from a tuyere to melt ash content and inorganic materials in their entirety.

According to the R system, wastes are crushed and supplied into a drum-type rotary furnace which is externally heated by high-temperature air. In the drum-type rotary furnace, the wastes are slowly pyrolyzed at a temperature of about 450° C. Carbonous materials generated at this time are discharged from the drum-type rotary furnace, and cooled down to a temperature at which they will not be ignited. Then, the carbonous materials are pulverized and supplied to a subsequent swirling type high-temperature combustor, and in the swirling-type high temperature combustor the pulverized carbonous materials and the gases supplied from the rotary furnace are combusted at a high temperature of about 1300° C. to melt ash content into molten slag.

The S and R systems suffer various disadvantages of their own as described below. In the S system, the operating cost of the shaft furnace is high because supplementary materials such as coke and oxygen-enriched air are required for maintaining the melting zone at the bottom of the furnace at a temperature ranging from 1700 to 1800° C. The use of the coke poses a problem that an increased amount of carbon dioxide is discharged from the furnace. Since almost all metals contained in the wastes are melted, they cannot be recycled as ingot metal in accordance with the type of metal. It is difficult for the furnace which belongs to a type of fixed-bed furnaces to operate stably because the wastes, in various different shapes, are stacked in layers in the furnace and the combusting/melting zone is present at a lowest region of the furnace. It is very important for a fixed-bed furnace to allow gases to flow uniformly in the layers, i.e., to maintain gas permeability. But the various different shapes of the wastes prevent the gases from flowing uniformly in the layers, and this tends to cause the gases to blow through the layers or to drift. The addition of the coke as supplemental fuel serves to keep gas permeability, but this role is not enough, and hence the flow rate of the gases and the internal pressure of the furnace cannot be kept constant. Since not all the generated gases pass through a high-temperature region in excess of 1000° C., it is impossible to completely prevent the generation of dioxins and furans.

In the R system, since the gasification furnace comprises a rotary furnace which is externally heated by high-temperature air, it has poor thermal conductivity and is unavoidably large in size. Further, tar produced by the thermal decomposition and undecomposed substances cover the heat transfer surface of the furnace, making its thermal conductivity poorer. It is difficult to obtain the high-temperature air which is heated up to 600° C. through a heat exchange with the exhaust gases in terms of the material of the heat exchanger. The generated carbonous materials are discharged from the rotary furnace, then pulverized, and supplied to a combustion furnace in which they are mixed with gases supplied directly from the rotary furnace and combusted at a high temperature. Therefore, the R system needs handling facilities for discharging, cooling, pulverizing, storing, and supplying the carbonous materials. Heat loss caused by cooling of the carbonous materials or heat radiation from the carbonous materials during handling thereof is not desirable from the standpoint of effective energy utilization. If the carbonous materials are discharged without being cooled, then they will be ignited by contact with air.

As described above, there have been proposed various types of systems for gasifying wastes and thereafter combusting generated substances at a high temperature to decompose dioxins and melt ash content into molten slag. However, no practically feasible technology yet has been available for recovering combustible gases by gasification from the chemical recycling viewpoint.

On the other hand, CO (carbon monoxide) and $H_2$ (hydrogen) are widely used as gases for materials of chemical synthesis. Carbon monoxide is used for chemical synthesis of gasoline, alcohol, organic acid, and ester. Hydrogen is used for chemical synthesis of ammonia ($NH_3$) or methanol, hydrogenation desulfurization, hydrogenolysis, fat hydrogenation, and welding. Carbon monoxide has been produced by gasification of coal or coke, and hydrogen has been produced by either steam reforming of natural gas or naphtha, or gasification of petroleum, coal or petroleum coke. Since most of those materials for producing CO or $H_2$ are dependent on importation from abroad, there has long been a need for materials for procuring CO or $H_2$ which are inexpensive and available without importation.

SUMMARY OF THE INVENTION

It is therefore an object of the present invention to provide a method and apparatus for treating wastes by gasification which can be operated easily and safely, have high thermal efficiency, and can produce low calorific gas or medium calorific gas that can be used as generation of electric power, industrial fuel gas, and materials for chemical industries.

In order to achieve the above object, according to one aspect of the present invention, there is provided a method for treating wastes by gasification, comprising the steps of: gasifying wastes in a fluidized-bed reactor at a relatively low temperature; introducing gaseous material and char produced in the fluidized-bed reactor into a high-temperature combustor; and producing low calorific gas or medium calorific gas in the high-temperature combustor at a relatively high temperature.

According to another aspect of the present invention, there is provided an apparatus for treating wastes by gasification and comprising: a fluidized-bed reactor for gasifying wastes at a relatively low temperature to produce gaseous material and char; and a high-temperature combustor for producing low calorific gas or medium calorific gas from the gaseous material and the char at a relatively high temperature.

The fluidized-bed reactor may comprise a revolving flow-type fluidized-bed reactor. The high-temperature combustor may comprise a swirling-type high-temperature combustor.

The relatively low temperature of the fluidized-bed reactor may be in the range of 450 to 800° C. The relatively low temperature of a fluidized-bed in the fluidized-bed reactor may be in the range of 450 to 650° C. The relatively high temperature in the high-temperature combustor may be 1300° C. or higher.

The gas supplied to the fluidized-bed reactor for gasification may comprise one of air, oxygen enriched air, a mixture of air and steam, a mixture of oxygen enriched air and steam, and a mixture of oxygen and steam. The gas supplied to the high-temperature combustor for gasification may comprise one of oxygen enriched air and oxygen.

The total amount of oxygen supplied to the fluidized-bed reactor and the high-temperature combustor may be in the range of 0.1 to 0.6 of the theoretical amount of oxygen for combustion. The amount of oxygen supplied to the fluidized-bed reactor may be in the range of 0.1 to 0.3 of the theoretical amount of oxygen for combustion.

The ash content in the wastes may be recovered as slag, while dioxins and precursor thereof may be substantially decomposed in the high-temperature combustor.

The low calorific gas or the medium calorific gas may have atmospheric pressure or high pressure, and may be used for power generation or fuel gas or synthesis gas for chemicals.

The fluidized-bed reactor may comprise a high pressure type fluidized-bed reactor. The high-temperature combustor may comprise a high pressure type high-temperature combustor. The fluidized-bed in the fluidized-bed reactor may be in a reducing atmosphere, and metal in the wastes may be discharged in non-oxidized condition from the fluidized-bed reactor.

The mixing ratio of low calorific wastes to high calorific wastes may be controlled on the basis of temperature of the fluidized-bed. The low calorific gas or the medium calorific gas may contain carbon monoxide and hydrogen.

Further, according to still another aspect of the present invention, there is provided a method for treating wastes by gasification, comprising the steps of: gasifying wastes in a fluidized-bed reactor at a relatively low temperature; introducing gaseous material and char produced in the fluidized-bed reactor into a high-temperature combustor; and producing calorific gas in the high-temperature combustor at a relatively high temperature.

The calorific gas is defined as gas mainly composed of CO and $H_2$ as combustible components.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
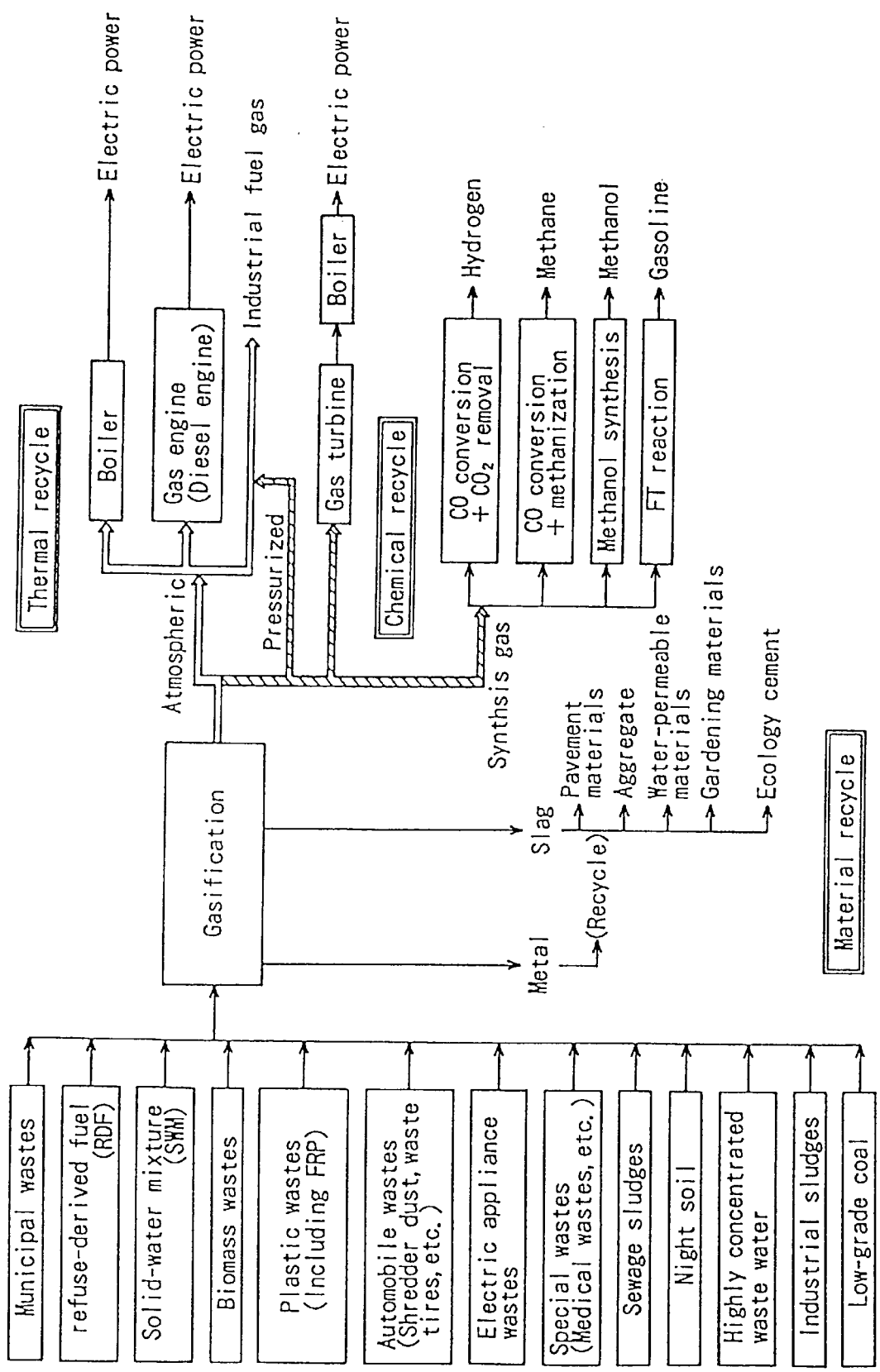
FIG. 1 is a block diagram showing a concept of a method for treating wastes by gasification according to the present invention.

A method and apparatus for treating wastes by gasification according to the present invention will be described below with reference to the drawings.

Wastes which are used in the present invention may be municipal wastes, refuse-derived fuel (RDF), solid-water mixture (SWM), biomass wastes, plastic wastes including fiber-reinforced plastics (FRP), automobile wastes (shredder dust, waste tires, etc.), electric appliance wastes, special wastes (medical wastes, etc.), sewage sludges, night soil, highly concentrated waste liquids, industrial sludges, which have widely different calorific values, moisture contents, shapes. These wastes may be used in combination. Low-grade coal may be used with these wastes.

Refuse-derived fuel (RDF) is produced by crushing and classifying municipal wastes, adding quicklime to the classified municipal wastes, and compacting them to shape.

Solid water mixture is produced by crushing municipal wastes, converting them into a slurry with water, and converting the slurry under a high pressure into an oily fuel by hydrothermal reaction. The low-grade coal may be brown coal, lignite, peat, which have low degrees of coalification, or coal refuse which is produced upon coal separation.

These wastes are first supplied into a fluidized-bed reactor, and pyrolized therein. Particularly, by employing a revolving-type fluidized-bed reactor as the reactor, the wastes which have been crushed to not minute but small lumps by pretreatment can be supplied to the fluidized-bed reactor. The reason is that by an intense revolving flow of the fluidizing medium, good heat transfer to the supplied wastes can be obtained, and large-sized incombustibles can be discharged from the fluidized-bed furnace. The effects of the revolving flow of the fluidized medium will be described later in detail.

Therefore, among these wastes, the municipal wastes, the biomass wastes, the plastic wastes, and the automobile wastes are roughly crushed to a size of about 30 cm. The sewage sludges and night soil which have a high moisture content are dehydrated into a cake by a centrifugal separator or the like in dedicated treatment facilities, and then the cake is transported to a plant site which has a treating system of the present invention. The refuse-derived fuel, the solid water mixture, and the highly concentrated waste liquids are used as they are. Coal added for calorie adjustment may be used as is, if it is crushed to a size of 40 mm or less.

The above wastes may be roughly grouped into high calorific wastes and low calorific wastes according to their own calorie content and their moisture content. Generally, the municipal wastes, the refuse-derived fuel, the solid water mixture, the plastic wastes, the automobile wastes, and the electric appliance wastes are high calorific wastes. The biomass wastes, the special wastes such as medical wastes, the dehydrated cake of sewage sludges and night soil, and the highly concentrated waste liquids are low calorific wastes.

These wastes are charged into a high calorific waste pit, low calorific waste pit, and a tank, and sufficiently stirred and mixed in the pits and the tank. Thereafter, they are supplied to the fluidized-bed reactor. Metals contained in the wastes which are supplied to the fluidized-bed reactor are recovered in a non-oxidized condition if their melting points are higher than the temperature of a fluidized-bed in the fluidized-bed reactor. Therefore, these recovered metals can be used as ingot metal in accordance with the particular type of metal.

If the wastes supplied to the fluidized-bed reactor have constant quality, the ratio of the wastes to the gas supplied to the fluidized-bed reactor for gasification is also constant. However, if the proportion of the low calorific wastes in the supplied wastes increases or the overall moisture content in the supplied wastes increases, the temperature of the fluidized-bed tends to go down from a set value. When the temperature of the fluidized-bed goes down, it is desirable to control the proportion of the low calorific wastes to the high calorific wastes in the supplied wastes to keep the calorific value of the supplied wastes constant from the viewpoint of the gas utilization facility at a later stage. Alternatively, high-grade coal may be added to adjust the calorific value of the supplied wastes.

Next, a fluidized-bed reactor for gasifying wastes at a relatively low temperature according to the present invention will be described below. Using such a fluidized-bed reactor for gasifying wastes at a relatively low temperature is one of the features of the present invention.

Fluidized-bed reactors themselves are known as combustion furnaces or gasification furnaces. However, it is a novel feature of the present invention to use a combination of a fluidized-bed reactor and a high-temperature combustor for producing combustible gases, differently from the prior art.

There is a known technology in which coal is supplied into a high-temperature gasification furnace as pulverized coal or coal water slurry. However, in the case of wastes, it is not easy to pulverize them, compared with coal. Particularly, if the wastes contain incombustibles such as metals, debris, or stones, then it is almost impossible to pulverize the wastes to a size of under $100\mu$, unlike coal. However, in case of using the fluidized-bed reactor, the coarsely crushed wastes can be pyrolized to thus generate combustible gaseous materials and fine char. The generated gaseous materials and char are introduced into a subsequent high-temperature combustor in which they are gasified at a relatively high temperature. For the fluidized-bed reactor, the only necessary work is to convert the wastes into combustible gaseous materials and char by a pyrolysis reaction, and thus the fluidized-bed in the fluidized-bed reactor can be kept at a relatively low temperature. The fluidized-bed reactor which can be used in the present invention may be a known atmospheric or pressurized bubbling-type fluidized-bed reactor, in consideration of characteristics of wastes to be treated. However, it is particularly preferable to use a revolving flow-type fluidized-bed reactor which has been developed by the inventors of the present invention.

The revolving flow-type fluidized-bed reactor preferably has a circular horizontal cross-section, and has a relatively mild fluidized-bed with a substantially low fluidizing gas rate in a central region and a relatively intensive fluidized-bed with a substantially high fluidizing gas rate in a peripheral region. The revolving flow-type fluidized-bed reactor has an inclined wall installed along an inner wall in the vicinity of the surface of the fluidized-bed, for deflecting the flow of the fluidized medium from the peripheral region toward the central region so that a revolving flow of the fluidized medium is formed in such a manner that the fluidized medium descends in the mild fluidized-bed, ascends in the intense fluidized-bed, moves from the central region toward the peripheral region in a lower portion of the fluidized-bed and moves from the peripheral region toward the central region in an upper portion of the fluidized-bed.

The revolving flow-type fluidized-bed reactor having a specific structure according to the present invention offers the following advantages:

1. Since the produced char is not accumulated on the fluidized-bed and is dispersed well and uniformly in the fluidized-bed, oxidization of char can be effectively carried out in the fluidized-bed, particularly in the intense fluidized-bed. Heat generated by oxidization of char is transferred to the fluidized medium, and the transferred heat can be effectively used as a heat source for thermal decomposition and gasification at a central portion of the fluidized-bed in the fluidized-bed reactor.

2. Since the particles of fluidized medium whose upward flow is deflected by the inclined wall collide with each other at the central portion of the fluidized-bed in the fluidized-bed reactor, char is pulverized. If hard silica sand is used as a fluidized medium, pulverization of char is further accelerated.

3. Since the wastes go down into the fluidized-bed by descending flow of the fluidized medium, solid wastes which have been coarsely crushed only can be supplied to the fluidized-bed reactor. Therefore, it is possible to dispense with pulverizing equipment, and electric power for pulverizing can be remarkably reduced.

4. Although large-sized incombustibles are included in the wastes due to coarse crushing of the wastes, such large-sized incombustibles can be easily discharged by the revolving flow of the fluidized medium from the fluidized-bed reactor.

5. Since the generated heat is dispersed by the revolving flow of the fluidized medium which is formed throughout the overall region of the fluidized-bed, difficulties caused by generation of agglomeration or clinker can be avoided.

In case of a bubbling-type fluidized-bed which is generally used, although the fluidized medium can be uniformly fluidized in the fluidized-bed, dispersion of the fluidized medium in horizontal directions is not carried out well. Therefore, the revolving flow-type fluidized-bed reactor of the present invention is superior to the bubbling-type fluidized-bed reactor with respect to the above advantages 1 through 5.

The fluidized-bed reactor of the present invention has a fluidized-bed whose temperature is in the range of 450 to 650° C. If the fluidized-bed temperature is lower than 450° C., since the reaction of thermal decomposing and gasifying the wastes would be extremely slow, undecomposed substances would be accumulated in the fluidized-bed, and an amount of produced char whose oxidization rate is slow would be increased. If the fluidized-bed temperature increases, the pyrolysis reaction of the wastes is speeded up, thereby solving the problem of the accumulation of undecomposed substances in the fluidized-bed. However, fluctuations in the feeding rate of wastes result in fluctuations in the amount of generated gas which would impair the operation of a subsequent swirling-type high-temperature combustor. This is because it is impossible to exactly adjust the amount of oxygen containing gas supplied to the swirling-type high-temperature combustor in accordance with the amount of gas generated in the fluidized-bed reactor. Therefore, an upper limit for the temperature in the fluidized-bed is set to 650° C. so that the pyrolysis reaction is relatively sluggish. The fluidized-bed reactor has a larger diameter portion above the fluidized-bed which is called "freeboard". By supplying oxygen containing gas such as substantially pure oxygen or oxygen enriched air to the freeboard, the load in the subsequent high-temperature combustor can be reduced, and gasification of tar and char in the generated gas can be accelerated in the free-board.

According to the present invention, a primary combustion of the wastes is carried out in the fluidized-bed at a temperature ranging from 450 to 650° C., and then a secondary combustion of the wastes is carried out in the freeboard at a temperature ranging from 600 to 800° C., preferably ranging from 650 to 750° C.

The fluidizing gas supplied to the fluidized-bed reactor for gasifying the wastes is selected from air, oxygen enriched air, a mixture of air and steam, a mixture of oxygen enriched air and steam, and a mixture of oxygen and steam. As a fluidized medium, sand such as silica sand or Olivine sand, alumina, iron powder, limestone, dolomite, or the like may be used.

The gases generated in the fluidized-bed reactor contain a large amount of tar and carbonous materials. The carbonous materials are crushed into powdery char in the fluidized-bed, and the powdery char and gases are introduced into the swirling-type high-temperature combustor. Since the fluidized-bed is in a reducing atmosphere, metals in the wastes can be discharged in a non-oxidized condition from the fluidized-bed reactor.

The metals which can be recovered are limited to those whose melting points are lower than the fluidized-bed temperature. Therefore, in order to recover aluminum having a melting point of 660° C., it is necessary to set the temperature in the fluidized-bed to 650° C. or less.

Inasmuch as the fluidized-bed reactor is used to gasify wastes at a relatively low temperature, it is possible to treat various wastes having a size in the range of several millimeters to dozens of centimeters. The treatment capability of the fluidized-bed reactor is high, and can be scaled up easily. The fluidized-bed reactor is free of moving parts so that it can easily be operated for adjustment of the temperature and other parameters, and has heat transfer among fluidized medium to keep the temperature of the fluidized-bed uniform.

If the fluidized-bed reactor comprises a revolving flow type fluidized-bed reactor, the wastes do not need to be pulverized before being charged into the fluidized-bed reactor. The produced carbonous materials are effectively crushed in the fluidized-bed into char which is well dispersed in the fluidized-bed, and thus the fluidized-bed reactor has a high capacity for gasification, can maintain the temperature of the fluidized-bed uniform, and has a high gasification efficiency.

Next, a high-temperature combustor will be described below. The high-temperature combustor is supplied with gaseous material and char introduced from the fluidized-bed reactor, and gasifies the gaseous material and char at a temperature of 1300° C. or higher by bringing them into contact with gas supplied to the high-temperature combustor. Tar and char are completely gasified, and ash content therein is discharged as molten slag from the bottom of the high-temperature combustor.

The high-temperature combustor may comprise a Texaco furnace in which coal water mixture is blown therein only from an upper part of the furnace, but may preferably comprise a swirling-type high-temperature combustor. In the swirling-type high-temperature combustor, gaseous material and char are gasified at a relatively high temperature while forming a swirling flow with gas, ash content is melted, and then resultant molten slag is separated and discharged therefrom.

By using the swirling-type high-temperature combustor, high load and high speed combustion can be performed, distribution of the residence time of gas becomes narrow, a carbon conversion percentage and a slag mist collecting efficiency are high, and the combustor can be of compact size.

The gas introduced into the high-temperature combustor for gasification may be selected from oxygen enriched air and oxygen. The total amount of oxygen supplied to the fluidized-bed reactor and the high-temperature combustor for gasification may be in the range of 0.1 to 0.6 of the theoretical amount of oxygen for combustion of the wastes. The amount of oxygen supplied to the fluidized-bed reactor may be in the range of 0.1 to 0.3 of the theoretical amount of oxygen for combustion of the wastes. In this manner, fuel gas having a low calorific value ranging from 1000 to 1500 kcal/Nm$^3$ (dry) or fuel gas having a medium calorific value ranging from 2500 to 4500 kcal/Nm$^3$ (dry) can be obtained from the high-temperature combustor. According to the present invention, gas containing CO and $H_2$ as main components can be produced from the wastes, and the produced gas can be used as industrial fuel gas or synthesis gas for chemical products.

Since ash content in char which is introduced into the subsequent high-temperature combustor from the fluidized-bed reactor is converted into molten slag in the high-temperature combustor, harmful metals are sealed in the slag and will not be eluted out. Dioxins and precursors thereof, and PCB (polyclorinated biphenyl) are fully decomposed by the high-temperature combustion in the high-temperature combustor.

Processes of utilizing produced gases for purposes depending on the nature of the gas will be described below with reference to FIG. 1. The processes are divided into thermal recycling for utilizing energy of the gas and chemical recycling for utilizing the gas as synthesis gas for chemical products. If the produced gas is high-temperature exhaust gas having atmospheric pressure, then steam generated in a steam boiler is supplied to a steam turbine which drives an electric generator to recover electric power. If the produced gas is fuel gas having atmospheric pressure, then it is consumed by a gas engine or a diesel engine which drives an electric generator to recover electric power, or it is used as industrial fuel gas. Industrial fuel gas may be used in an ironmaking or steelmaking process.

If the produced gas is fuel gas having high pressure ranging from 20 to 40 atm, then it is used in a combined cycle power generation system including a gas turbine, or as an industrial fuel gas. If the produced gas is medium calorific fuel gas containing no $N_2$ and having high pressure, then it is used as synthesis gas for producing hydrogen, methane (SNG), alcohols such as methanol, and gasoline.

Hydrogen is produced by converting CO and $H_2O$ in the synthesis gas into $CO_2$, and $H_2$, and removing $CO_2$. Methane is produced by CO shift conversion to adjust the ratio of carbon-monoxide to hydrogen and methanization. Methanol is produced by CO shift conversion and methanol synthesis reaction. Mixtures of alcohols higher than methanol and ethanol are produced by alcohol synthesis reaction. Gasoline is synthesized by a Fischer-Tropsch reaction as carried out in Sasol of the Republic of South Africa.

It is desirable to select an optimum process in consideration of the quality and quantity of wastes to be treated, conditions of a site where a treatment system is built, and a product to be produced.

Next, utilization of the slag will briefly be described below. Since slag generated from wastes and recovered from the high-temperature combustor contains a certain amount of chlorine, it is desirable to use the recovered slag as materials for so-called "ecology cement". Ecology cement is produced from incineration ash, sewage sludges, and additives that are mixed at respective proportions of 4:3:3, and can be used as concrete products free of reinforcing bars, and solidification materials. The slag is recovered as quenched slag or slow-cooling slag, and may be used as construction materials including pavement materials, aggregates, water-permeable materials, or gardening materials.

Various apparatuses for treating wastes by gasification according to the present invention will be described below.

Like or corresponding parts are denoted by like or corresponding reference numerals throughout the drawings.

Figure 2:
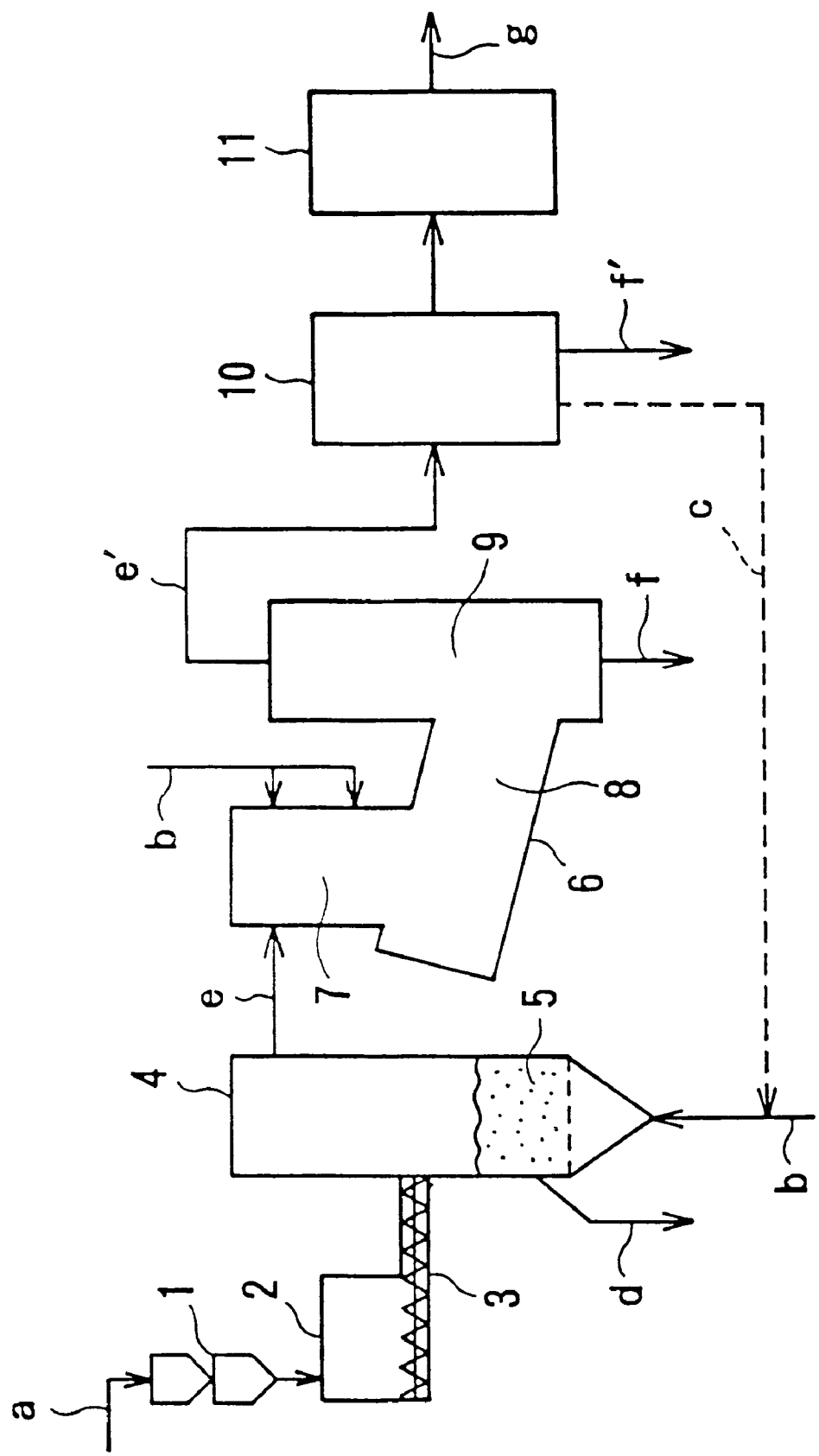
FIG. 2 is a schematic diagram of an apparatus for carrying out the treating method according to a first embodiment of the present invention.

FIG. 2 schematically shows an apparatus for carrying out the method for treating wastes by gasification according to a first embodiment of the present invention.

The apparatus shown in FIG. 2 serves to produce synthesis gas having high pressure ranging from 20 to 40 atm. The apparatus includes a lock hopper system 1, a hopper 2, a screw feeder 3, and a fluidized-bed reactor 4 having a fluidized-bed 5 therein. The apparatus further includes a swirling-type high-temperature combustor 6 having a primary combustion chamber 7, a secondary combustion chamber 8 and a slag separation chamber 9, a waste heat boiler 10, and a scrubber 11. In FIG. 2, the symbols, a, b, c, and d represent wastes, oxygen, steam, and incombustibles, respectively. Further, the symbols e, e', f, f' and g represent gas generated in fluidized-bed reactor 4, gas generated in swirling-type high-temperature combustor 6, slag, ash, and produced gas, respectively.

Wastes "a" which have been uniformly mixed are charged through the lock hopper system 1 into the hopper 2, from which the wastes "a" are supplied at a constant feed rate through the screw feeder 3 into the fluidized-bed reactor 4. A mixture of oxygen "b" and steam "c" is supplied as fluidizing gas into a bottom portion of the fluidized-bed reactor 4. The wastes "a" dropped into the fluidized-bed 5 in the fluidized-bed reactor 4 are contacted with the gas supplied into the fluidized-bed reactor 4 for gasification in the fluidized-bed which is kept at a temperature ranging from 450 to 650° C. The wastes "a" are rapidly pyrolized in the fluidized-bed 5 and gas, tar, carbonous materials, and $H_2O$ are generated. The carbonous materials are crushed into char by a vigorous action of the fluidized-bed 5.

The gas, tar, $H_2O$ and char are then supplied altogether into the primary combustion chamber 7 of the swirling-type high-temperature combustor 6, in which they are mixed with oxygen "b" for gasification supplied to the high-temperature combustor in a swirling flow thereof and rapidly oxidized at a temperature of 1300° C. or higher. Thus, ash content in the char is converted into slag mist which is trapped by slag phase on an inner wall of the combustor under the centrifugal forces of the swirling flow. The trapped slag mist then flows down on the inner wall and enters the secondary combustion chamber 8, from which slag "f" is discharged from a bottom of the slag separation chamber 9 to the outside of the combustor 6. The gasification reaction at the relatively high temperature is completed in the secondary combustion chamber 8, producing medium calorific gas which comprises $H_2$, CO, $CO_2$ and $H_2O$ and has a calorific value ranging from 2500 to 4500 kcal/$Nm^3$.

Since the fluidized-bed 5 in the fluidized-bed reactor 4 is in a reducing atmosphere, those metals, contained in the wastes "a", whose melting points are higher than the temperature of the fluidized-bed remain in a non-oxidized condition, and are discharged as incombustibles "d" together with debris, stones, glass, etc. from the bottom of the fluidized-bed reactor 4. The discharged metals can be reused as ingot metal in accordance with the type of metal.

The gas discharged from the swirling-type high-temperature combustor 6 is supplied to the waste heat boiler 10 that generates steam "c". In the scrubber 11, the gas supplied from the waste heat boiler 10 is cooled and scrubbed with an aqueous solution of NaOH to remove dust and HCl which would be harmful to a CO conversion catalyst, thus generating refined gas "g". The refined combustible gas "g" may be used as industrial fuel gas. In this case, there is no need for CO conversion, and hence the scrubber 11 may be of a relatively simple structure. The generated gas "g" which comprises $H_2$, CO, $CO_2$ and $H_2O$ can be used as synthesis gas for chemical products.

Figure 3:
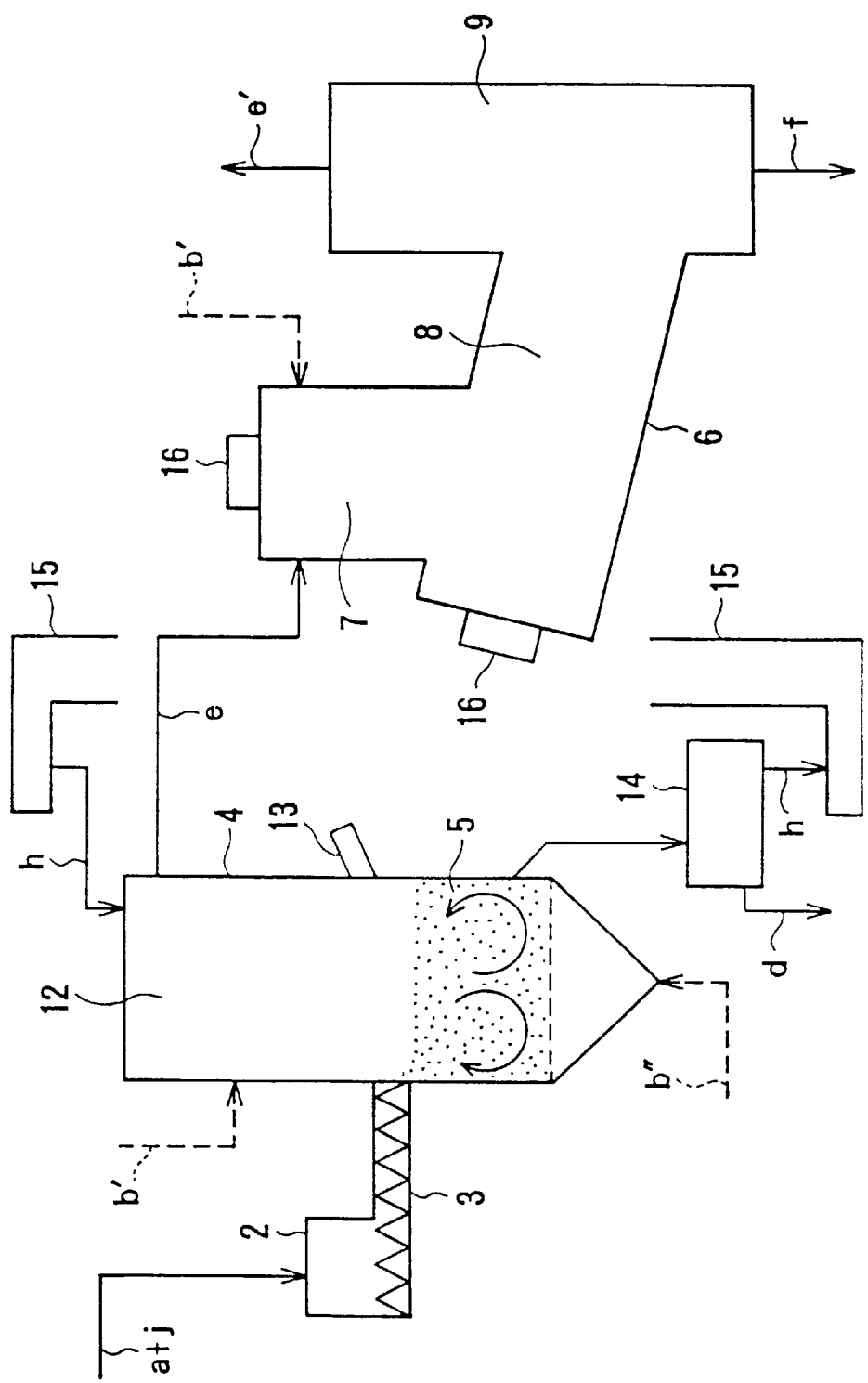
FIG. 3 is a schematic diagram of an apparatus for carrying out the treating method according to a second embodiment of the present invention.

FIG. 3 shows an apparatus for treating wastes by gasification according to a second embodiment of the present invention. The apparatus comprises a revolving flow-type fluidized-bed reactor under atmospheric pressure to produce low calorific gas.

As shown in FIG. 3, the fluidized-bed reactor 4 has a freeboard 12 and a burner 13, and is connected to a trommel 14 which is associated with a bucket conveyor 15. The swirling-type high-temperature combustor 6 has burners 16. Other details of the apparatus shown in FIG. 3 are essentially the same as those of the apparatus shown in FIG. 2.

Wastes "a" and coal "j" are supplied to the hopper 2, and then supplied at a constant feed rate by the screw feeder 3 to the fluidized-bed reactor 4. Preheated air "b" is introduced as a fluidizing gas into the fluidized-bed reactor 4 from a bottom thereof, forming a fluidized-bed 5 of silica sand over a dispersion plate.

Fluidizing gas having a relatively low fluidizing gas velocity is supplied into the central part of the fluidized-bed 5, and fluidizing gas having a relatively high fluidizing gas velocity is supplied into the peripheral part of the fluidized-bed 5, thus forming revolving flows of the fluidized medium in the fluidized-bed reactor 4 as shown in FIG. 3.

The wastes "a" and the coal "j" are charged into the fluidized-bed 5 and are contacted with $O_2$ in air within the fluidized-bed 5 which is kept at a temperature ranging from 450 to 650° C. Upon contact with $O_2$, the wastes "a" and the coal 5 "j" are quickly pyrolized. The silica sand of the fluidized medium and incombustibles are discharged from the bottom of the fluidized-bed reactor 4 and enter the trommel 14. Large-sized incombustibles "d" and the silica sand are separated by the trommel 14, and the large-sized incombustibles "d" are discharged to the outside of the apparatus, and the silica sand "h" is supplied to the bucket conveyor 15. The bucket conveyor 15 carries the silica sand "h" upwardly and charges it back into the fluidized-bed reactor 4 from an upper end thereof. The discharged non-combustible material "d" contain metals. Since the fluidized-bed 5 is kept at a temperature ranging from 500 to 600° C., iron, copper, and aluminum can be recovered in a non-oxidized condition suitable for recycling.

When the wastes "a" are gasified at a relatively low temperature in the fluidized-bed 5, gas, tar, carbonous materials and $H_2O$ are generated. The gas, tar and $H_2O$ are vaporized and ascend in the fluidized-bed reactor 4. The carbonous materials are pulverized into char by a stirring action of the fluidized-bed 5. Since the char is porous and light, it is carried with the upward flow of the generated gas. Since the fluidized medium of the fluidized-bed 5 is hard silica sand "h", the pulverization of the carbonous materials is accelerated. Air "b" is blown into the freeboard 12 to gasify the gas, tar, and char again at a temperature ranging from 600 to 800° C. for thereby accelerating conversion of gas components into low-molecular components and gasification of tar and char. The generated gas "e" discharged from the fluidized-bed reactor 4 is supplied into the primary combustion chamber 7 of the swirling-type high-temperature combustor 6, and combusted at a high temperature of 1300° C. or higher while being mixed with preheated oxygen enriched air "b'" in a swirling flow thereof. The combustion reaction is completed in the secondary combustion chamber 8, and the generated exhaust gas "e'" is discharged from the slag separation chamber 9. Because of the high temperature in the swirling-type high-temperature combustor 6, ash content in the char is converted into slag mist which is trapped by molten slag phase on an inner wall of the primary combustion chamber 7 due to the centrifugal forces of the swirling flow. The molten slag flows down on the inner wall and enters the secondary combustion chamber 8, from which slag "f" is discharged from a bottom of the slag separation chamber 9. The primary and secondary combustion chambers 7 and 8 are provided with the respective burners 16 for start-up. In this manner, combustible gas having a low calorific value ranging from 1000 to 1500 kcal/Nm³ is produced.

Figure 4:
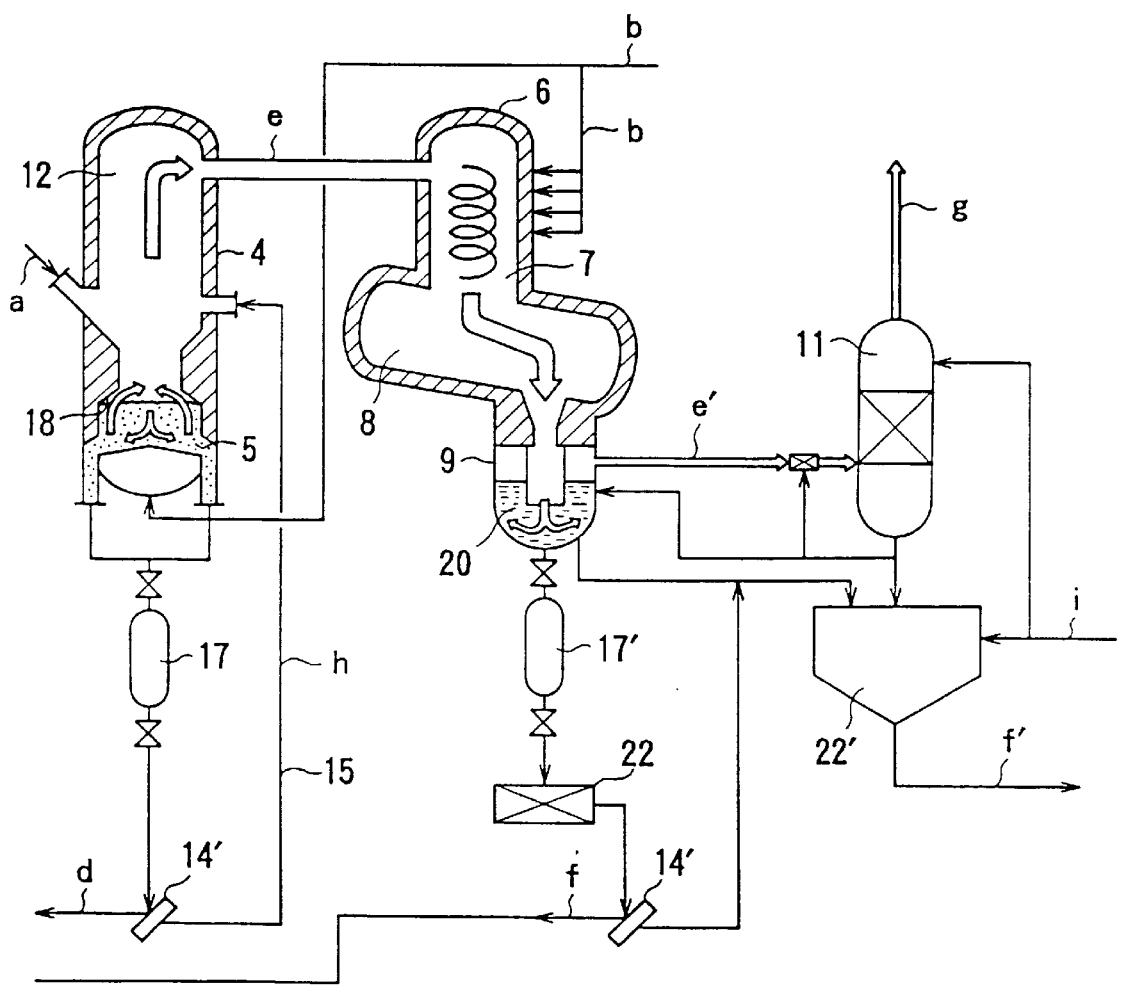
FIG. 4 is a schematic diagram of an apparatus for carrying out the treating method according to a third embodiment of the present invention.

FIG. 4 shows an apparatus for treating wastes by gasification according to a third embodiment of the present invention. The apparatus comprises a swirling-type high-temperature combustor which is of another type, for generating synthesis gas under a pressure ranging from 10 to 40 atm.

As shown in FIG. 4, the fluidized-bed reactor 4 comprises a revolving-type fluidized-bed reactor, and the swirling-type high-temperature combustor 6 comprises a swirling-type high-temperature combustor having a water tank 20 in a lower end thereof.

The fluidized-bed reactor 4 is connected to a lock hopper 17 which is associated with a screen 14'. The fluidized-bed reactor 4 has an inclined wall 18 therein for circulating fluidized medium therein. The swirling-type high-temperature combustor 6 is connected to a lock hopper 17' which is connected to a reservoir tank 22. The swirling-type high-temperature combustor 6 is connected to a scrubber 11 and a reservoir tank 22'.

In FIG. 4, the fluidized-bed reactor 4 comprises a revolving-type fluidized-bed reactor in which carbonous materials are not accumulated on a fluidized-bed, but uniformly dispersed in the fluidized-bed for thereby accelerating pulverization and gasification. Consequently, the wastes "a" may be crushed coarsely prior to being charged into the fluidized-bed reactor 4, and incombustibles of relatively large size can be discharged from the fluidized-bed reactor 4. Since the fluidized-bed reactor 4 is highly effective in diffusing heat generated therein, clinker problems are avoided.

Wastes "a" are supplied at a constant feed rate through a lock hopper or the like to the fluidized-bed reactor 4. A mixture of $O_2$ "b" and steam is introduced as a gasifying agent into the fluidized-bed reactor 4 from a bottom thereof, forming a fluidized-bed 5 of silica sand as the fluidized medium over a dispersion plate. In the fluidized-bed 5, the fluidized medium is circulated on the dispersion plate to form a revolving flow of the fluidized medium. The wastes "a" are charged onto the fluidized-bed 5 and contacted with the gasifying agent within the fluidized-bed 5 which is kept at a temperature ranging from 450 to 650° C. and under a pressure ranging from 10 to 40 atm. Being contacted with the gasifying agent, the wastes "a" are rapidly pyrolized. The silica sand "h" and incombustibles "d" in the fluidized-bed 5 are discharged from the bottom of the fluidized-bed reactor 4, passed through the lock hopper 17, and then supplied to the screen 14' by which the incombustible materials "d" are separated. The silica sand "h" is charged back through a fluidized medium circulation path 15 into the fluidized-bed reactor 4. The discharged incombustible materials "d" contain metals. Since the fluidized-bed 5 is kept at a temperature ranging from 500 to 600° C., iron, copper, and aluminum can be recovered in a non-oxidized condition suitable for recycling.

When the wastes "a" are gasified in the fluidized-bed 5, gas, tar, and carbonous materials are generated. The gas and tar are evaporated and ascend in the fluidized-bed reactor 4. The carbonous materials are pulverized into char by a revolving action of the fluidized-bed 5. Since the char is porous powder and light, it is carried with the upward flow of the generated gas. Since the fluidized medium of the fluidized-bed 5 comprises hard silica sand "h", the pulverization of the carbonous materials is promoted.

The generated gas "e" discharged from the fluidized-bed reactor 4 is supplied to the primary combustion chamber 7 of the swirling-type high-temperature combustor 6. In the swirling-type high-temperature combustor 6, the gas "e" is mixed with preheated oxygen "b" in a swirling flow thereof and gasified at a temperature of 1300° C. or higher. Because of the high temperature in the swirling-type high-temperature combustor 6, ash content contained in the char is converted into slag mist which flows down on an inner wall of the high-temperature combustor 6 as molten slag and enters the water tank 20. After the slag is granulated in the water tank 20, the granulated slag "f" is supplied through the lock hopper 17' into the reservoir tank 22. Slag granules are supplied to the screen 14 and coarse slag "$f_c$" is separated from fine slag "$f_f$". The gas gasified at a relatively high temperature is cooled in the water tank 20, and discharged as gas "e'" which is cooled and scrubbed by the scrubber 11. Thereafter, refined gas "g" is produced.

Figure 5:
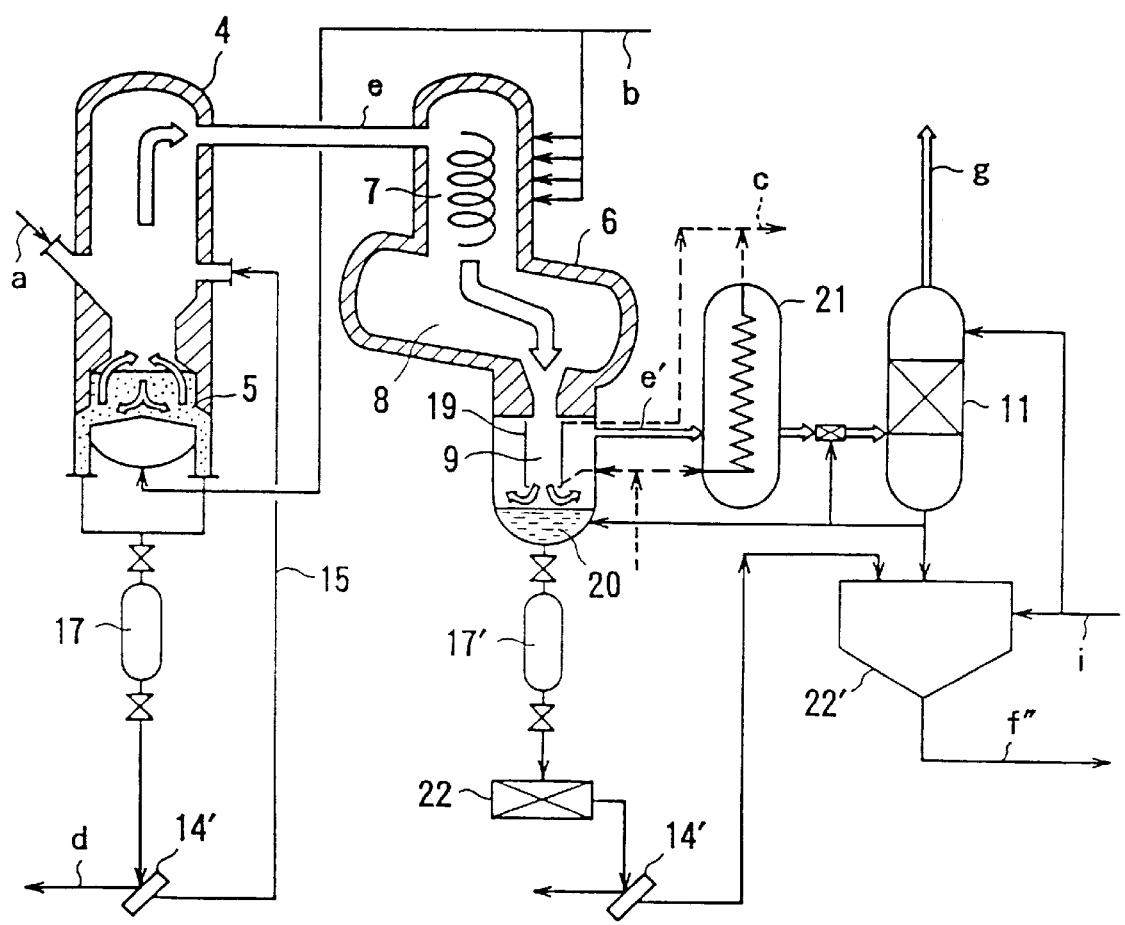
FIG. 5 is a schematic diagram of an apparatus for carrying out the treating method according to a fourth embodiment of the present invention.

FIG. 5 shows an apparatus for treating wastes by gasification according to a fourth embodiment of the present invention. The apparatus comprises a swirling-type high-temperature combustor which is of another type.

As shown in FIG. 5, a radiation boiler 19 is disposed in the slag separation chamber 9 of the swirling-type high-temperature combustor 6, and the water tank 20 is installed below the radiation boiler 19 such that gas which descends close to the water surface in the water tank 20 then ascends behind the radiation boiler 19.

In the radiation boiler 19, since the gas flows in the same direction as gravity, slag attached to an inner wall of the combustor 6 flows down without clogging. The heat of the slag which flows downwardly is recovered by the radiation boiler 19, thus raising the efficiency of heat recovery.

Further, since the direction of the gas flow is abruptly changed in the vicinity of the water surface in the water tank 20, most of the slag mist contained in the gas is trapped by the water in the water tank 20 due to inertia forces.

The gas "e'" discharged from the swirling-type high-temperature combustor 6 is supplied to convection boiler 21 in which heat is recovered from the gas "e'".

The secondary combustion chamber 8 in the swirling-type high-temperature combustor 6 may be dispensed with. The process shown in FIG. 5 is considered to be optimum for generating electric power.

Typical test data of the system shown in FIG. 3 are given below.

Table 1 shown below represents properties of wastes to be gasified. The wastes comprise ordinary municipal wastes with coal added for calorie adjustment.

TABLE 1

| (Properties of waste) | |
|---|---|
| Moisture | 25% (wet base) |
| Combustible materials | 66% (wet base) |
| Ash content | 9% (wet base) |
| Lower calorific value | 3,500 kcal/kg (wet base) |
| Higher calorific value | 5,034 kcal/kg (wet base) |

The wastes are gasified at a relatively low temperature ranging from 500 to 600° C. by the fluidized-bed reactor, and then gasified at a relatively high temperature of 1350° C. by the swirling-type high-temperature combustor. Data of the gasifying process are given in Tables 2 through 4 shown below. Table 2 shown below represents a material balance of an overall gasification in which wastes are represented by 100.

TABLE 2

| (material balance) | | |
|---|---|---|
| Input Materials | Wastes | 100 (standard) |
| | Oxygen | 46 |
| | Steam | 36 |
| Output Materials | Generated dry gas | 112 |
| | Moisture | 61 |
| | Noncombustible materials and slag | 9 |

As shown in table 2, as a gasifying agent 46 of oxygen and 36 of steam are consumed. The gasification system generates 112 of gas which is greater than the wastes because oxygen is added to the generated gas as the gasifying agent.

Table 3 shows a heat balance of the gasification system in which the combustion heat of the wastes is represented by 100.

TABLE 3

| (Heat balance) | | |
|---|---|---|
| Input heat | Q of wastes | 100 standard |
| | H of steam | 7.5 |
| Output heat | Q of generated dry gas | 60 |
| | H of generated dry gas | 16.8 |
| | H of moisture in generated gas | 21.1 |
| | Heat loss of sand + H of noncombustible materials and slag | 3.7 |
| | Heat loss of furnace wall | 5.9 |

Notes: 1) The heat balance was prepared in terms of the higher calorific value.
2) Q: Combustion heat, H: Enthalpy Since the combustion heat of the generated gas is 60, a cold gas efficiency is 60%. The cold gas efficiency represents the ratio of the combustion heat of the generated gas divided by the combustion heat of the wastes supplied.

It can be seen from the Tables that for recovering combustible gas, 3500 kcal/kg may be used as a lower limit for the lower calorific value of the wastes. If the lower calorific value of the wastes exceeds 3500 kcal/kg, then the cold gas efficiency becomes greater than 60%. The heat loss from the furnace wall is 5.9. If the heat loss can be reduced, the cold gas efficiency can be further increased.

Table 4 shows the dry gas composition of the generated gas. Moisture content in the gas is not counted.

TABLE 4

| (Dry gas composition of generated gas) | |
|---|---|
| $H_2$ | 47% |
| CO | 30% |
| $CO_2$ | 23% |

Combustible components of $H_2$ and CO occupy 77%. Therefore, a volume corresponding to 77% of $H_2$ is obtained after CO shift conversion.

Figure 6:
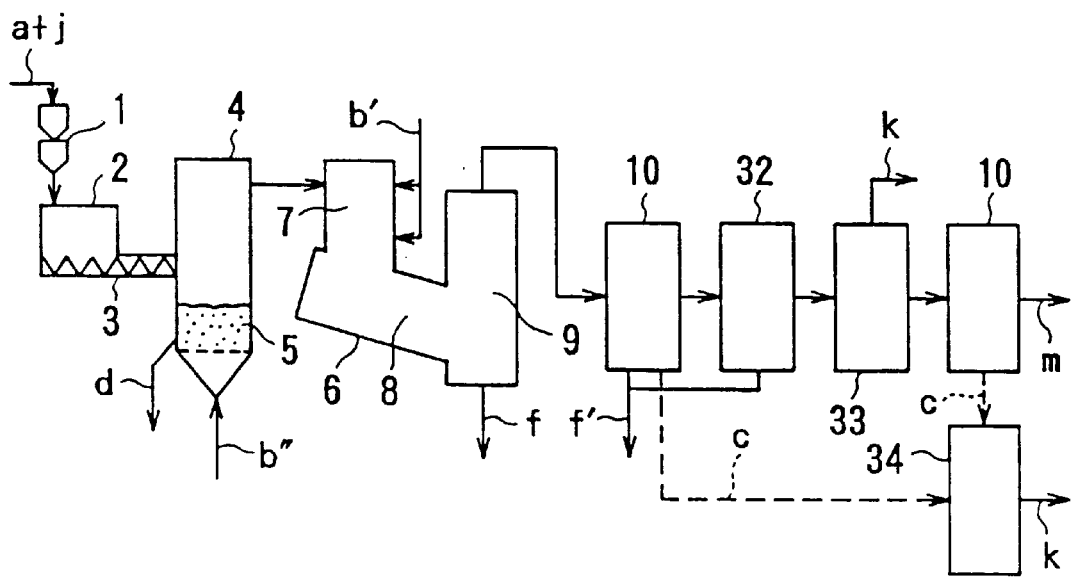
FIG. 6 is a schematic diagram of an apparatus for carrying out the treating method according to a fifth embodiment of the present invention.

FIG. 6 shows another system for treating wastes by gasification according to a fifth embodiment of the present invention.

In FIG. 6, low calorific fuel gas is produced under a high pressure of about 20 atm, and then is supplied to a combined cycle power generation system including a gas turbine 33 and a steam turbine 34 for generating electric power. As shown in FIG. 6, the system is similar to the system shown in FIG. 2 except that it additionally has a ceramic filter 32, gas turbine 33, and steam turbine 34.

In FIG. 6, symbols k and m represent electric power and exhaust gas, respectively. Wastes "a" and coal "j" are charged through the lock hopper system 1 into the hopper 2 from which the wastes "a" and the coal "j" are supplied by the screw feeder 3 into the fluidized-bed reactor 4. Air "b" is supplied to the fluidized-bed reactor 4, and oxygen enriched air "b'" is supplied to the high-temperature combustor 6. Therefore, generated gas discharged from the high-temperature combustor 6 is low calorific combustible gas composed of $H_2$, CO, $CO_2$, $N_2$ and $H_2O$ and having a calorific value ranging from 1000 to 1500 $kcal/Nm^3$ (dry). Temperatures in the fluidized-bed reactor 4 and the high-temperature combustor 6 are the same as those in the system for carrying out the method according to the first embodiment in FIG. 2.

Steam "c" is recovered from the gas by the waste heat boiler 10, and fly ash "f" is separated from the gas by the ceramic filter 32. Thereafter, the combustible gas is supplied to the gas turbine 33 and combusted to generate electric power "k". Then, steam "c" is recovered from the combustion gas by another waste heat boiler 10, after which the combustion gas is discharged as exhaust gas "m" into the atmosphere. The collected steam "c" is supplied to the steam turbine 34 to generate electric power "k". In the illustrated system, dust is removed from the generated gas by the ceramic filter 32 at the high temperature, and then the gas is supplied to the gas turbine 33. However, the generated gas may be refined at a normal temperature and then supplied to the gas turbine 33 in the same manner as in FIG. 2, although such a process lowers the efficiency of power generation.

Figure 7:
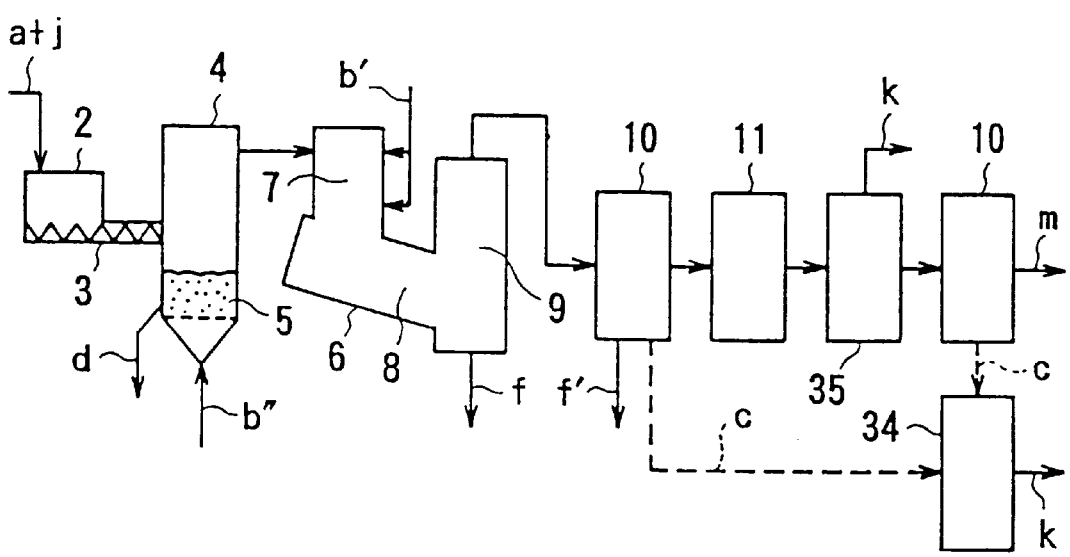
FIG. 7 is a schematic diagram of an apparatus for carrying out the treating method according to a sixth embodiment of the present invention.

FIG. 7 shows still another system for treating wastes by gasification according to a sixth embodiment of the present invention.

In FIG. 7, low calorific fuel gas is produced under atmospheric pressure, and then is supplied to a combined cycle power generation system including a gas engine for generating electric power. As shown in FIG. 7, the system is similar to the system shown in FIG. 6 except that it employs a scrubber 11 and a gas engine 35 instead of the ceramic filter 32 and the gas turbine 33. The system shown in FIG. 7 is also free of any lock hopper for supplying wastes "a" and coal "j" to the hopper 2.

Air "b'" is supplied to the fluidized-bed reactor 4, and oxygen enriched air "b'" is supplied to the high-temperature combustor 6. Therefore, generated gas discharged from the high-temperature combustor 6 is low calorific combustible gas composed of $N_2$, $H_2$, CO, $CO_2$ and $H_2O$ and having a calorific value ranging from 1000 to 1500 $kcal/Nm^3$ (dry). Temperatures in the fluidized-bed reactor 4 and the high-temperature combustor 6 are the same as those in the system according to the first embodiment in FIG. 2.

Steam "c" is recovered from the generated gas by the waste heat boiler 10, and the gas is cooled and scrubbed by the scrubber 11. The combustible gas produced at a normal temperature is supplied to the gas engine 35 and combusted to generate electric power "k". Then, steam "c" is recovered from the combustion gas by another waste heat boiler 10, after which the gas is discharged as exhaust gas "m" into the atmosphere. The collected steam "c" is supplied to the steam turbine 34 to generate electric power "k". The waste heat boiler 10 subsequent to the gas engine 35 may be dispensed with for a reduction in cost, but results in a drop of the power generation efficiency.

Figure 8:
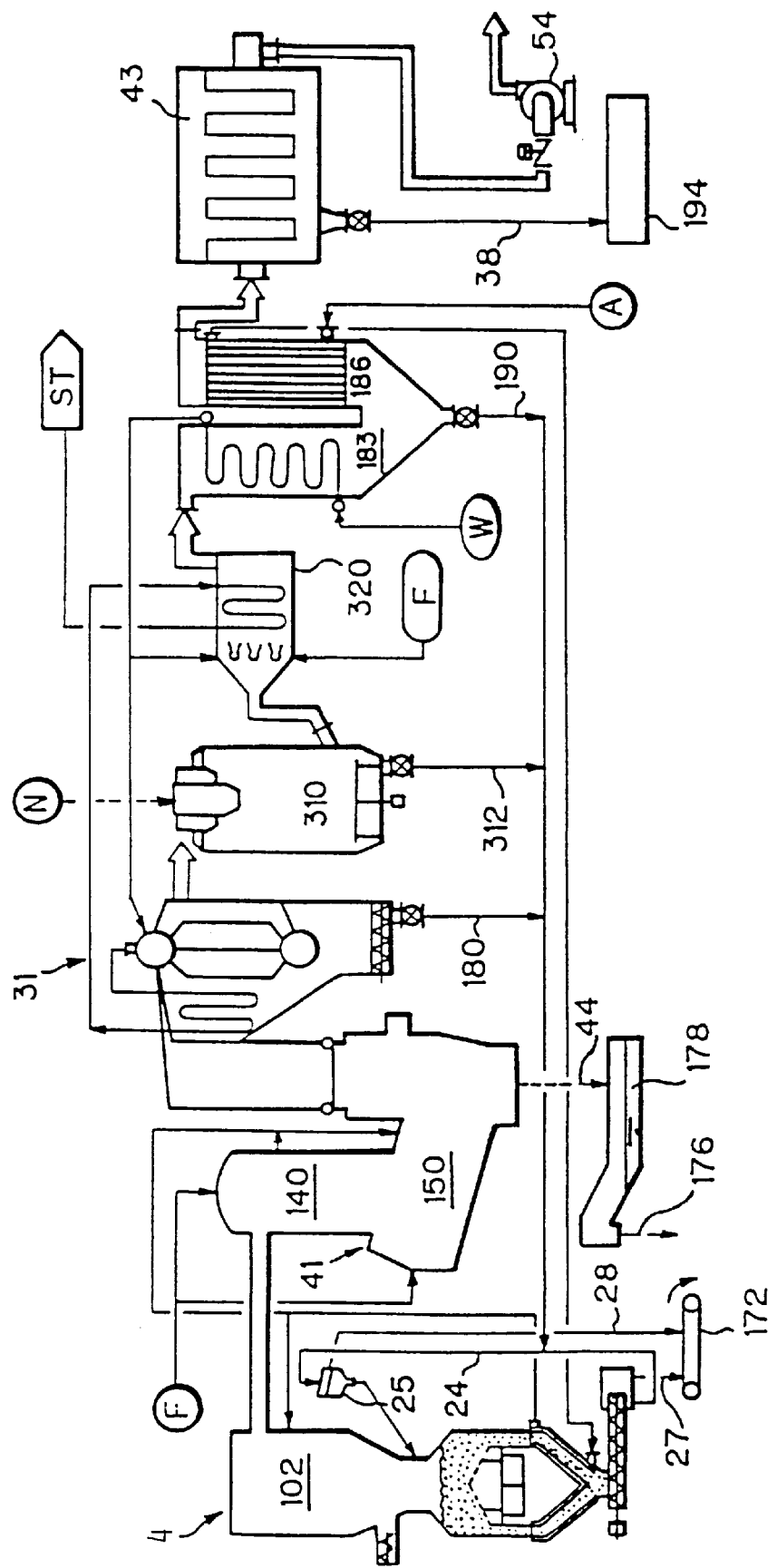
FIG. 8 is a schematic diagram of an apparatus for carrying out the treating method according to a seventh embodiment of the present invention.

FIG. 8 shows the arrangement of a fluidized-bed gasification furnace and a melt combustion furnace according to a seventh embodiment of the present invention which are used in combination with a waste heat boiler 31 and a reaction tower 310. In FIG. 8, a gasification furnace 4, a melt combustion furnace 41, a water chamber 178, waste heat boiler 31, a steam turbine ST, an economizer 183, an air preheater 186, a dust collector 43, an induced draft fan 54, etc. are provided. In the arrangement shown in FIG. 8, reaction tower 310 and a superheat combustor 320 are disposed between the waste heat boiler 31 and the economizer 183.

In the process shown in FIG. 8, gasification furnace 4 is supplied with the combustible matter (i.e. wastes) and fluidizing gas. The fluidizing gas includes a central fluidizing gas supplied to the central portion of the furnace bottom, and a peripheral fluidizing gas supplied to the peripheral portion of the furnace bottom. The central fluidizing gas has a lower linear velocity than that of the peripheral fluidizing gas. The upward stream of fluidizing gas and fluidized medium in the upper part of the peripheral portion of the furnace is turned over or deflected to the central portion of the furnace by an inclined wall, thereby forming a moving bed, in which a fluidized medium (generally, siliceous sand) settles and diffuses, in the central portion of the furnace, and also forming a fluidized-bed in which the fluidized medium is actively fluidized in the peripheral portion in the furnace, thus creating circulating flow of the fluidized medium. In the gasification furnace 4, the supplied combustible matter is gasified while circulating together with the fluidized medium. The oxygen content of the central fluidizing gas is set not higher than that of the peripheral fluidizing gas, and the temperature of the fluidized-bed is maintained in a range of from 450° to 650° C. The central fluidizing gas is one selected from three gases, i.e. steam, a gaseous mixture of steam and air, and air. The peripheral fluidizing gas is one selected from three gases, i.e. oxygen, a gaseous mixture of oxygen and air, and air. The fluidizing gas that is supplied to the fluidized-bed furnace contains an amount of oxygen that is not greater than 30% of the theoretical amount of oxygen required for combustion of combustible matter. The pressure in the fluidized-bed furnace is maintained at a level equal to or above atmospheric pressure dependent on usage. The combustible matter may be wastes, coal, and so forth. Further, since combustion takes place at a low air ratio under a reducing atmosphere condition, metals such as iron and aluminum contained in the combustible matter can be recovered in non-oxidized condition from the fluidized-bed.

Combustible gas containing fine particles of char is produced in the gasification furnace 4 and is introduced into the melt combustion furnace 41. The melt combustion furnace 41 includes a cylindrical primary combustion chamber 140 having an approximately vertical axis, and a secondary combustion chamber 150 which is inclined horizontally. The melt combustion furnace 41 is supplied with a gas which is one of three gases, i.e. oxygen, a gaseous mixture of oxygen and air, and air, so that the combustible gas and fine particles are partially burned at 1300° C. or higher, and the resulting ash is melted. In addition, harmful substances, e.g. dioxins, PCB, etc., are decomposed. The molten ash 44 is discharged from the melt combustion furnace 41 and is directly quenched in water chamber 178 and then is discharged as slag 176.

The resultant combustible gas discharged from the melt combustion furnace 41 passes through waste heat boiler 31 where heat is recovered, and then is supplied to the reaction tower 310. In the reaction tower 310, a neutralizer N, e.g.

slaked line slurry, is added to the combustible gas, thereby removing HCl from the gas. Solid fine particles 180 discharged from the reaction tower 310, together with solid fine particles 180 discharged from the waste heat boiler 31, are sent to classifier 25 by sand circulating elevator 24. In superheat combustor 320, combustible gas and an auxiliary fuel F are burned to raise the steam temperature to about 500° C. In the apparatus shown in FIG. 8, the steam has a high temperature and high pressure. The oxygen ratio (i.e. amount of supplied oxygen divided by the theoretical amount of oxygen required for combustion of combustible matter) is low, so that the quantity of sensible heat carried by the exhaust gas is small. Therefore, the power generation efficiency can be increased to about 30%.

The exhaust gas discharged from the superheat combustor 320 is discharged to the atmosphere through economizer 183, air preheater 186, dust collector 43 and induced shaft fan 54. Fly ash 38 separated in the dust collector 43 contains heavy metals, e.g. Hg, Cd, Pb, Zn, etc., and salts of alkali metals, e.g. Na, K, etc., that have been volatilized at high temperature, and therefore is treated with chemicals in treating device 194. The combustion gas from the secondary combustion chamber 150 of the melt combustion furnace 41 also may be used to drive a gas turbine.

The method according to the present invention serves to convert wastes into combustible gas and synthesis gas for chemical products, and to recover valuable resources for achieving environmental conservation. The method is effective to utilize wastes as new resources through thermal, material, and chemical recycling.

Specifically, the method according to the present invention offers the following advantages:

1. Wastes are converted into medium calorific synthesis gas by a gasification process based on a combination of low and high-temperature gasification processes, and the medium calorific synthetic gas is used for synthesis gas for chemical industries for producing, for example, ammonia, methanol, or the like, thus achieving the chemical recycling.

2. In the process of generating synthesis gas, ash content is converted into slag which is not harmful. The produced slag may be used as a construction and building material for material recycling.

3. Valuable metals including iron, copper, aluminum, etc. contained in wastes can be recovered in a non-oxidized state for material recycling.

4. Low calorific combustible gas is recovered for use as fuel for a gas turbine or the like, or industrial fuel gas for thermal recycling.

5. Toxic dioxins are almost fully decomposed by the high-temperature combustion in the high-temperature combustor at a temperature of 1300° C. or higher.

Although certain preferred embodiments of the present invention have been shown and described in detail, it should be understood that various changes and modifications may be made thereto without departing from the scope of the invention as defined by the appended claims.

What is claimed is:

1. A method for treating combustible matter by gasification, said method comprising:

supplying said combustible matter into a fluidized-bed reactor;

gasifying said combustible matter in said fluidized-bed reactor at a temperature ranging from 450 to 800° C. by contacting said combustible matter with a gasifying agent supplied to said fluidized-bed reactor to produce gas and carbonous material, said carbonous material being crushed into char in a fluidized-bed using sand or alumina as a fluidized medium;

introducing said gas and said char produced in said fluidized-bed reactor directly into a high-temperature combustor; and producing low calorific gas or medium calorific gas in said high-temperature combustor by combusting said gas and said char at a temperature of at least 1300° C. by contacting said gas and said char with gas supplied to said high-temperature combustor, and recovering slag by melting ash content contained in said char.

2. A method according to claim 1, wherein said high-temperature combustor comprises a swirling-type high-temperature combustor.

3. A method according to claim 1, wherein said gasifying agent supplied to said fluidized-bed reactor comprises a gas selected from the group consisting of air, oxygen enriched air, a mixture of air and steam, a mixture of oxygen enriched air and steam, and a mixture of oxygen and steam.

4. A method according to claim 1, wherein said gas supplied to said high-temperature combustor comprises one of oxygen enriched air and oxygen.

5. A method according to claim 1, wherein a total amount of oxygen supplied to said fluidized-bed reactor and to said high-temperature combustor is in a range of 0.1 to 0.6 of a theoretical amount of oxygen for combustion.

6. A method according to claim 5, wherein an amount of oxygen supplied to said fluidized-bed reactor is in the range of 0.1 to 0.3 of said theoretical amount of oxygen for combustion.

7. A method according to claim 1, wherein an inside of said fluidized-bed reactor is maintained in a reducing atmosphere and, if metal is present with said combustible matter, said metal is discharged in non-oxidized condition from said fluidized-bed reactor.

8. A method according to claim 1, wherein said fluidized-bed reactor comprises a revolving flow-type fluidized-bed reactor and said fluidized-bed comprises a mild fluidized-bed and an intensive fluidized-bed, and a revolving flow of the fluidized medium is formed in such a manner that the fluidized medium descends in the mild fluidized-bed, ascends in the intensive fluidized-bed, moves from the mild fluidized-bed toward the intensive fluidized-bed in a lower portion of said fluidized-bed and moves from the intensive fluidized-bed toward the mild fluidized-bed in an upper portion of said fluidized bed.

9. A method according to claim 1, wherein said fluidized-bed reactor comprises a revolving flow-type fluidized-bed reactor in which a revolving flow of the fluidized medium is formed in the fluidized-bed by forming a mild fluidized-bed with a substantially low fluidizing gas rate in a certain region and an intensive fluidized-bed with a substantially high fluidizing gas rate in another region.

10. A method for treating combustible matter by gasification, said method comprising:

supplying said combustible matter to which coal is added into a fluidized-bed reactor;

gasifying said combustible matter in said fluidized-bed reactor by contacting said combustible matter with a gasifying agent supplied to said fluidized-bed reactor to produce gas and char;

introducing said gas and said char produced in said fluidized-bed reactor into a high-temperature combustor; and producing low calorific gas or medium calorific gas in said high-temperature combustor by combusting said gas and said char by contacting said gas and said char with gas supplied to said high-temperature combustor, and recovering slag by melting ash content contained in said char.

11. A method according to claim 10, wherein said high-temperature combustor comprises a swirling-type high-temperature combustor.

12. A method according to claim 10, wherein said gasifying of said combustible matter in said fluidized-bed reactor is carried out at a temperature ranging from 450 to 800° C.

13. A method according to claim 10, wherein said combusting of said gas and said char supplied to said high-temperature combustion is carried out at a temperature of at least 1300° C.

14. A method according to claim 10, wherein said gasifying agent supplied to said fluidized-bed reactor comprises a gas selected from the group consisting of air, oxygen enriched air, a mixture of air and steam, a mixture of oxygen enriched air and steam, and a mixture of oxygen and steam.

15. A method according to claim 10, wherein said gas supplied to said high-temperature combustor comprises one of oxygen enriched air and oxygen.

16. A method according to claim 10, wherein a total amount of oxygen supplied to said fluidized-bed reactor and to said high-temperature combustor is in a range of 0.1 to 0.6 of a theoretical amount of oxygen for combustion.

17. A method according to claim 16, wherein an amount of oxygen supplied to said fluidized-bed reactor is in the range of 0.1 to 0.3 of said theoretical amount of oxygen for combustion.

18. A method according to claim 10, wherein an inside of said fluidized-bed reactor is maintained in a reducing atmosphere and, if metal is present with said combustible matter, said metal is discharged in non-oxidized condition from said fluidized-bed reactor.

19. A method according to claim 10, wherein said fluidized-bed reactor comprises a revolving flow-type fluidized-bed reactor having a fluidized-bed using a fluidized medium, said fluidized-bed comprising a mild fluidized-bed and an intensive fluidized-bed, and a revolving flow of the fluidized medium is formed in such a manner that the fluidized medium descends in the mild fluidized-bed, ascends in the intensive fluidized-bed, moves from the mild fluidized-bed toward the intensive fluidized-bed in a lower portion of said fluidized-bed and moves from the intensive fluidized-bed toward the mild fluidized-bed in an upper portion of said fluidized bed.

20. A method according to claim 10, wherein said fluidized-bed reactor comprises a revolving flow-type fluidized-bed reactor in which a revolving flow of a fluidized medium is formed in a fluidized-bed by forming a mild fluidized-bed with a substantially low fluidizing gas rate in a certain region and an intensive fluidized-bed with a substantially high fluidizing gas rate in another region.

21. A method for treating combustible matter by gasification, said method comprising:
supplying said combustible matter into a fluidized-bed reactor;
gasifying said combustible matter in said fluidized-bed reactor at a temperature ranging from 450 to 800° C. by contacting said combustible matter with a gasifying agent supplied to said fluidized-bed reactor;
introducing gas and char produced in said fluidized-bed reactor into a high-temperature combustor; and
producing low calorific gas or medium calorific gas in said high-temperature combustor by combusting said gas and said char at a temperature of at least 1300° C. by contacting said gas and said char with gas supplied to said high-temperature combustor, and recovering slag by melting ash content contained in said char.

22. A method according to claim 21, wherein said high-temperature combustor comprises a swirling-type high-temperature combustor.

23. A method according to claim 21, wherein said gasifying agent supplied to said fluidized-bed reactor comprises a gas selected from the group consisting of air, oxygen enriched air, a mixture of air and steam, a mixture of oxygen enriched air and steam, and a mixture of oxygen and steam.

24. A method according to claim 21, wherein said gas supplied to said high-temperature combustor comprises one of oxygen enriched air and oxygen.

25. A method according to claim 21, wherein a total amount of oxygen supplied to said fluidized-bed reactor and to said high-temperature combustor is in a range of 0.1 to 0.6 of a theoretical amount of oxygen for combustion.

26. A method according to claim 25, wherein an amount of oxygen supplied to said fluidized-bed reactor is in the range of 0.1 to 0.3 of said theoretical amount of oxygen for combustion.

27. A method according to claim 21, wherein an inside of said fluidized-bed reactor is maintained in a reducing atmosphere and, if metal is present with said combustible matter, said metal is discharged in non-oxidized condition from said fluidized-bed reactor.

28. A method according to claim 21, wherein said fluidized-bed reactor comprises a revolving flow-type fluidized-bed reactor having a fluidized-bed using a fluidized medium, said fluidized-bed comprising a mild fluidized-bed and an intensive fluidized-bed, and a revolving flow of the fluidized medium is formed in such a manner that the fluidized medium descends in the mild fluidized-bed, ascends in the intensive fluidized-bed, moves from the mild fluidized-bed toward the intensive fluidized-bed in a lower portion of said fluidized-bed and moves from the intensive fluidized-bed toward the mild fluidized-bed in an upper portion of said fluidized bed.

29. A method according to claim 21, wherein said fluidized-bed reactor comprises a revolving flow-type fluidized-bed reactor in which a revolving flow of a fluidized medium is formed in a fluidized-bed by forming a mild fluidized-bed with a substantially low fluidizing gas rate in a certain region and an intensive fluidized-bed with a substantially high fluidizing gas rate in another region.

30. A method for treating combustible matter by gasification, said method comprising:
supplying said combustible matter into a fluidized-bed reactor;
gasifying said combustible matter in said fluidized-bed reactor at a low temperature by contacting said combustible matter with a gasifying agent which is a mixture of oxygen and steam;
introducing gas produced in said fluidized-bed reactor into a high-temperature combustor;
processing said gas in said high-temperature combustor at a high temperature, and forming molten slag; and
cooling said slag and said gas to obtain cooled slag and cooled gas.

31. A method according to claim 30, wherein said high-temperature combustor comprises a swirling-type high-temperature combustor.

32. A method according to claim 30, wherein said gasifying of said combustible matter in said fluidized-bed reactor is carried out at a temperature ranging from 450 to 800° C.

33. A method according to claim 30, wherein said high-temperature at which said gas is processed in said high-temperature combustor is at least 1300° C.

34. A method according to claim 30, wherein one of oxygen enriched air and oxygen is supplied to said high-temperature combustor for use in processing said gas.

35. A method according to claim 30, wherein a total amount of oxygen supplied to said fluidized-bed reactor and to said high-temperature combustor is in a range of 0.1 to 0.6 of a theoretical amount of oxygen for combustion.

36. A method according to claim 35, wherein an amount of oxygen supplied to said fluidized-bed reactor is in the range of 0.1 to 0.3 of said theoretical amount of oxygen for combustion.

37. A method according to claim 30, wherein an inside of said fluidized-bed reactor is maintained in a reducing atmosphere and, if metal is present with said combustible matter, said metal is discharged in non-oxidized condition from said fluidized-bed reactor.

38. A method according to claim 30, wherein said fluidized-bed reactor comprises a revolving flow-type fluidized-bed reactor having a fluidized-bed using a fluidized medium, said fluidized-bed comprising a mild fluidized-bed and an intensive fluidized-bed, and a revolving flow of the fluidized medium is formed in such a manner that the fluidized medium descends in the mild fluidized-bed, ascends in the intensive fluidized-bed, moves from the mild fluidized-bed toward the intensive fluidized-bed in a lower portion of said fluidized-bed and moves from the intensive fluidized-bed toward the mild fluidized-bed in an upper portion of said fluidized bed.

39. A method according to claim 30, wherein said fluidized-bed reactor comprises a revolving flow-type fluidized-bed reactor in which a revolving flow of a fluidized medium is formed in a fluidized-bed by forming a mild fluidized-bed with a substantially low fluidizing gas rate in a certain region and an intensive fluidized-bed with a substantially high fluidizing gas rate in another region.

* * * * *

UNITED STATES PATENT AND TRADEMARK OFFICE
CERTIFICATE OF CORRECTION

PATENT NO. : 6,190,429 B1
DATED : February 20, 2001
INVENTOR(S) : Hiroyuki Fujimura et al.

It is certified that error appears in the above-identified patent and that said Letters Patent is hereby corrected as shown below:

Title page, item [63],
Under the heading "Related U.S. Application Data" should read as follows:

-- Continuation of application No. 08/877,810, filed on Jun. 18, 1997, now Pat. No. 5,922,090, which is a continuation-in-part of application No. 08/753,607, filed on Nov. 27, 1996, now abandoned, and a continuation of application No. 08/547,126, filed on Oct. 24, 1995, now Pat. No. 5,725,614, and a division of application No. 08/401,370, filed on Mar. 9, 1995, now Pat. No. 5,620,488. --;

Title page, item [30],
Under the heading "Foreign Application Priority Data", the first-listed foreign application should read: -- Mar. 10, 1994 (JP) .....................6-65439 --.

Signed and Sealed this

Sixteenth Day of October, 2001

Attest:

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.    : 6,190,429 B1  
DATED         : February 20, 2001  
INVENTOR(S)   : Hiroyuki Fujimura et al.

It is certified that error appears in the above-identified patent and that said Letters Patent is hereby corrected as shown below:

<u>Title page,</u>  
Item [30], Foreign Application Priority Data, the listing for the second-listed priority application data should read:

-- Apr. 15, 1994 (JP) ….. 6-101541 --.

Signed and Sealed this

Thirtieth Day of July, 2002

*Attest:*

JAMES E. ROGAN  
*Director of the United States Patent and Trademark Office*

*Attesting Officer*